INVENTOR:
RAYMOND K. STRASEL
BY: *[signature]*
ATTORNEY

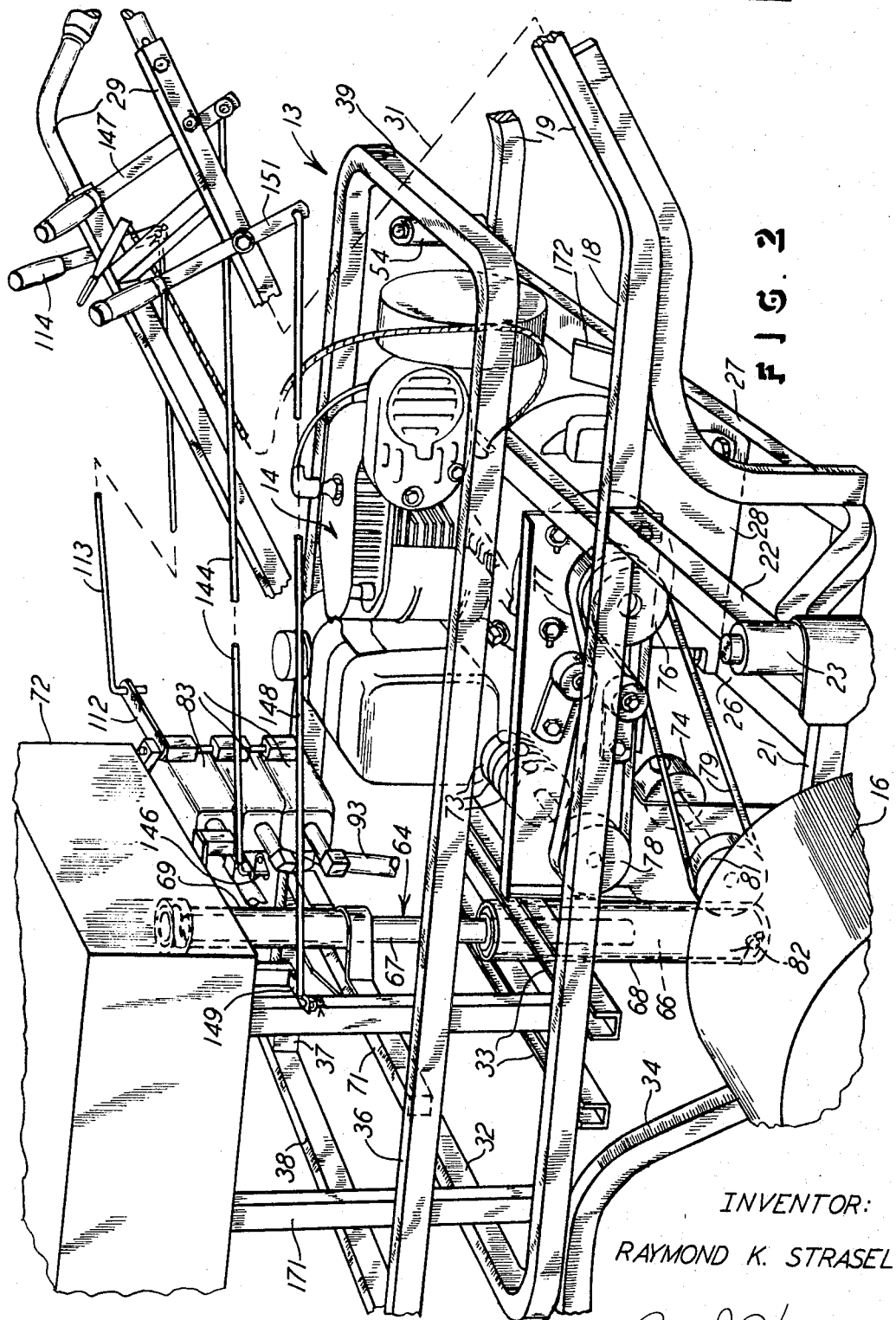

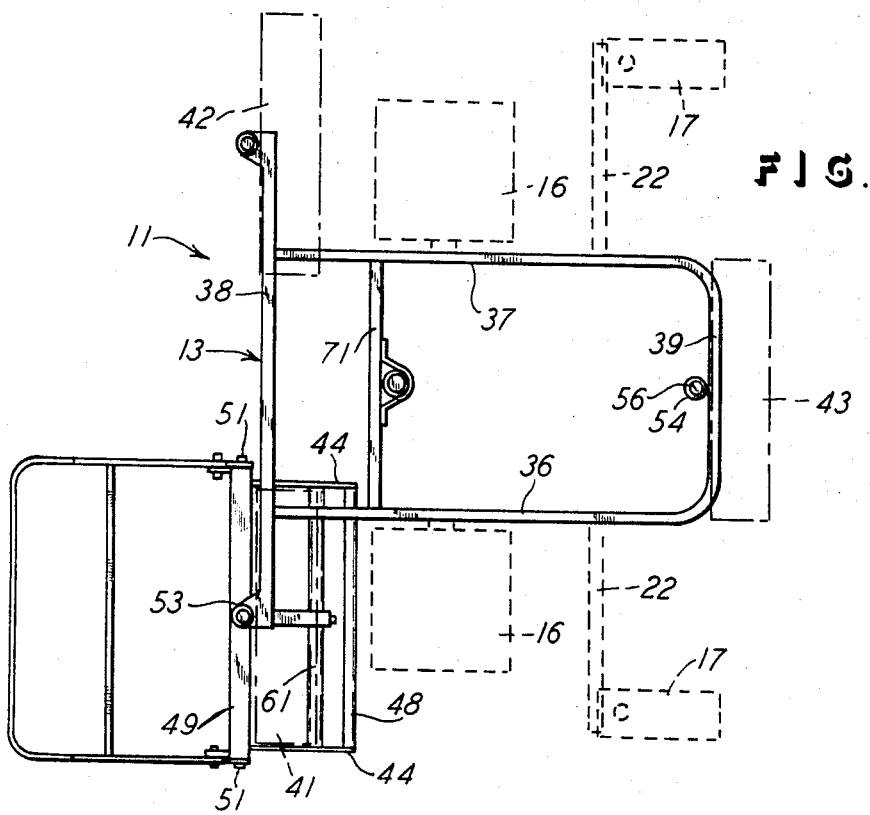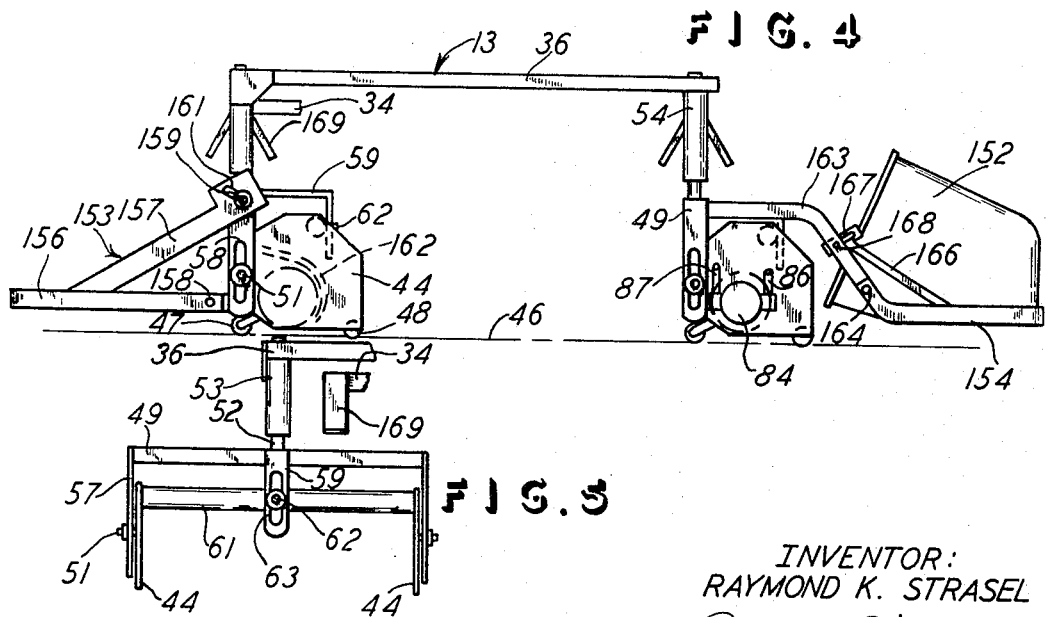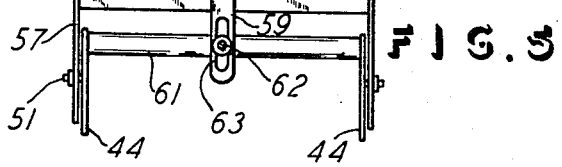

INVENTOR:
RAYMOND K. STRASEL
BY: Arthur J. Hansmann
ATTORNEY

United States Patent Office 3,429,110
Patented Feb. 25, 1969

3,429,110
GANG LAWNMOWER
Raymond K. Strasel, Winthrop Harbor, Ill., assignor to Jacobsen Manufacturing Company, Racine, Wis., a corporation of Wisconsin
Filed Aug. 9, 1965, Ser. No. 478,049
U.S. Cl. 56—7          11 Claims
Int. Cl. A01d 35/12, 75/30

ABSTRACT OF THE DISCLOSURE

A gang lawnmower including a ground supported and steerable tractor with supporting means or a frame. A vertically movable frame is supported on the tractor frame, and a plurality of lawnmowers are guided by the vertically movable frame. The mowers have connections to the movable frame, such that the weight of the frame, and the weight of the grass catchers and other parts, do not fall upon the mowers. Pivotal connections exist between the frame and the mowers, for pivoting the mowers in all directions for tracking and riding over irregular ground. The entire unit is hydraulically powered.

---

This invention relates to a gang lawnmower.

The gang lawnmower of this invention has special application for mowing golf course greens, and the like, wherein the requirements are that an extremely smooth cut be made of the grass. This is of course of obvious importance with respect to golf course greens which are used for putting, and it is desired to get the grass perfectly smooth so that the ball will not be diverted or deflected in its rolling course. A gang type lawnmower is preferred for this mower application on putting greens since the mowing need be done in only a minimum of time and thereby have the green in use for a maximum of time, and also, the gang lawnmower provides a wider swath and thus a better mowing pattern for the rolling of the golf ball along a true course. The mowing time is almost in proportion to the number of mowers employed in each gang unit, and thus only a minimum of time is required where a plurality of mowers are employed in a single gang unit.

Accordingly, it is an object of this invention to provide a generally improved gang-type lawnmower which provides an optimum smoothness of cut on the grass being mowed.

Another object of this invention is to provide a gang lawnmower for use on a golf course putting green, or the like, wherein only a minimum of time is required for mowing the area.

Still another object of this invention is to provide a completely powered gang unit, in the instance described it is a hydraulically powered unit, which gives optimum smoothness of cut by synchronizing the drive of the traction wheels with the drive of the mower reels, and which also has only a minimum of weight applied on the ground by the mowing reels themselves. To accomplish this object, a tractor-type unit is employed with traction wheels driven in synchronization with the drive of the mower reels, and also, the maximum amount of weight, including even the grass catchers, is supported on the tractor wheels which are specially made to roll over the ground with only a minimum of ground impression.

Still another object of this invention is to accomplish the foregoing object and to do so with mower reels which are articulately mounted on the tractor frame so that the reels completely conform to the contour of the ground. In accomplishing this particular object, the reels may tip with respect to the tractor frame both in the lateral plane and the fore-and-aft plane with respect to the direction of movement of the tractor.

Still a further object of this invention is to accomplish the aforementioned objects and to do so with a gang-type lawnmower which can be readily disposed between the cutting position and the transport position. Further, in the cutting position, the reels are arranged to steer with the steering of the supporting tractor unit so that there is only a minimum of force applied by the cutting units to the ground, and thus there is no scuffing or other damage to the grass. Further, in the transport position, the mowing units are held secure against any swinging and like motion, though they are fully articulate when they are in the lowered and operating position.

Still a further object of this invention is to provide a tractor-powered gang-type lawnmower wherein the weight of the grass catchers is supported only on the tractor unit, and not on the mowers themselves, and the catchers are movably mounted on the tractor unit so that they can move upwardly to avoid damage to the ground in the event they encounter a rise or like condition which would cause the catchers or their supporting means to engage the ground. This of course avoids damage to the ground since the catcher supporting means will simply pivot or otherwise move off the ground in the event they contact the ground.

Still a further object of this invention is to provide a tractor-powered, gang-type lawnmower wherein the tractor wheels are disposed rearwardly of forwardly located mowing units so that the wheels do not depress the turf or grass before it is mowed. This is significant when it is realized that mowing on a golf course green, for instance, may be removing only one-quarter of an inch of grass in order to provide a smooth cut and remaining smooth green.

Other objects and advantages will become apparent upon reading the following description in light of the accompanying drawings, wherein:

FIG. 2 is an enlarged side perspective view of the embodiment shown in FIG. 1, but showing the central portion thereof only.

FIG. 3 is a top plan view of a fragment of the embodiment with the mowers in dot-dash lines and with portions of the tractor unit in dotted lines.

FIG. 4 is a side elevational view of FIG. 3 with parts omitted and added.

FIG. 5 is a rear elevational view of a fragment of FIG. 4, and particularly showing the mower frame and connecting fork.

Figure 1:
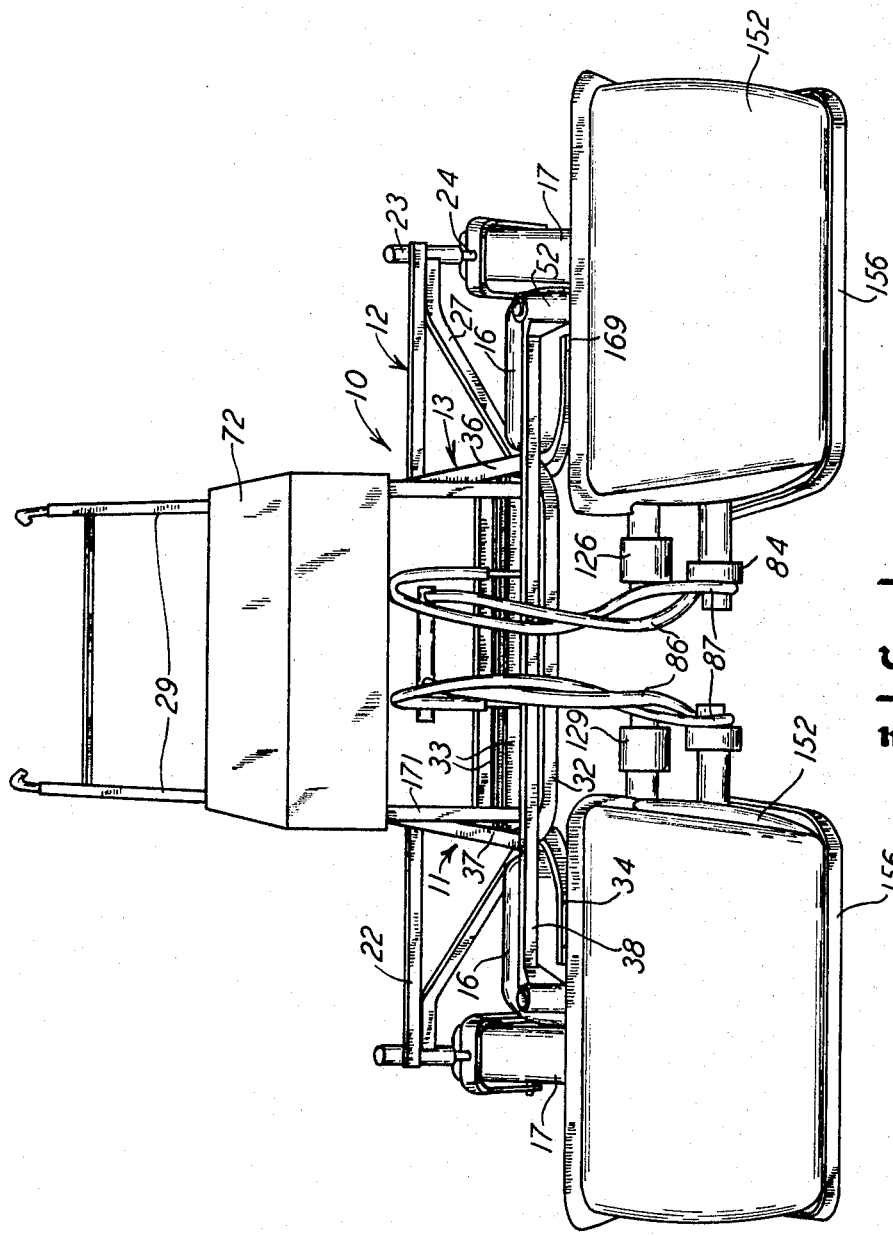
FIG. 1 is a front perspective view of certain parts of a preferred embodiment of this invention.

Generally, the gang mower of this invention has a tractor unit, generally designated 10 and a mower unit generally designated 11. The tractor unit is further described as including a frame, generally designated 12, and the mower unit is also described as including a frame, generally designated 13. The tractor unit includes the power plant or prime mover, which is shown to be a gasoline engine assembly, generally designated 14 in FIG. 2, and it includes two wide ground wheels 16 and two narrower caster wheels 17, all four of which are rotatably mounted as a part of the tractor unit 10. The wide wheels 16 basically support the entire gang mower on the ground, and they do so with a minimum of pressure so that the impression on the ground is a minimum and the lawn is therefore not depressed.

The tractor frame 12 includes a generally rectangularly disposed piece 18 which extends rearwardly into handles 19 which of course the operator may grasp to control the direction of the gang mower. This may be either a walk behind type of mower or a sulky or other seat (not shown) may be attached to the mower unit for riding if desired. The tractor frame further includes the lower carriage or frame piece 21 which is welded or otherwise suitably secured to the frame piece 18 at their points of apparent contact. Also, laterally extending frame pieces 22 support sleeves 23 which in turn rotatably support axles 24 in the vertical direction for the castering wheels 17. Of course the prime mover or engine 14 is suitably mounted on the tractor frame 10, as are the wheels 16 and 17, and frame cross pieces 26 and 27 and engine mounting members 28, are all provided for mounting the engine 14 as shown and mentioned.

FIGS. 1 and 2 further show the handles 29 extending rearwardly on the tractor frame 10, and the dotted line 31 in FIG. 2 shows the actual location of the near handle 29 with respect to the handle frame section 19 previously described.

Thus the tractor frame 18 is generally rectangular in plan view, and it includes the side pieces connected by the front piece indicated 32, and the three sections are disposed in a common horizontal plane. The rearwardly extending sections 19 indicate the termination of the horizontal portion of the frame 18. Cross pieces 33 are connected between the sides of the frame 18, and an additional frame piece 34 extends at the forward end of the tractor frame 12, as shown in FIGS. 1 and 2.

FIGS. 1 through 5 show the mower unit 11 which is mounted on the tractor unit 10. Here it will be noted that the mower frame 13 is also of a rectangular configuration in plan view, and it includes the side frame pieces 36 and 37 and the front piece 38 and the rear piece 39. Thus the mower frame 13 is of the same planular shape as the tractor frame 18, and in fact it rides directly on the tractor frame in the mowing or lowered position of the mower frame, as shown in FIG. 1.

FIG. 3 shows the location of three mower reels 41, 42, and 43, all of which are articulately mounted o nthe mowe frame 13. The reels are shown in dot-dash lines in FIG. 3, and they are shown in dot-dash circles in FIG. 4. Further, the reels are shown to be supported between mower side plates 44 which are movably supported on the ground line designated 46 in FIG. 4. The support is by means of a forward roller 47 and a rearward roller 48, both of which extend across the width of the mowers and between the plates 44. Mower supporting forks 49 are connected to the plates 44 by means of pins 51, or the like, so that the mowers may be secured to the mower or carrier frame 13. The mower forks 49 are pivotally attached to the mower frame 13 through the upright shaft 52 which is connected to the fork 49. A sleeve 53 depends from the mower frame front member 38 to rotatably receive the shaft 52 so that the mowers can of course pivot or rotate about the axis of the shaft 52 in steering the mowers in accordance with the steering of the entire unit. That is, if the entire unit is turned to the right, then the right hand ends of the mowers 41, 42, and 43, will move rearwardly while the left hand ends will move forwardly to turn about the turning center of the entire unit. This is a natural maneuver since the sleeves 53 are located forwardly on the mower unit which are therefore in trailing and tracking position. Of course this mounting is true of the two front mowers 41 and 42, and a similar sleeve 54 and vertical pin 56 are provided for the rear mower 43, and the sleeve 54 is secured to the mower frame piece 39, as seen in FIG. 2, as well as in FIG. 3 and FIG. 4. It will be further understood that the shafts or pins 52 are attached to the affixed sleeves 53 in a suitable manner so that upon raising the mower frame 13, the shafts 52 and 54 will also be raised and thereby raise the mower forks 49 and the entire mowers.

The forks 49 include uprightly disposed side members 57 which have slots 58 for receiving the pins 51. It will therefore be apparent that both ends of the mowers can move up and down within the limits of the slots 58 and thus adjust themselves to the contour of the ground being mowed. Another important feature of this arrangement is that the mower frame 13 is resting on the tractor frame 12, but the mower frame 13 is not placing its weight on the mower units themselves. That is, the mower units are resting directly on the ground but do not support any part of the framing described such as the mower frame 13 and the mower forks 49.

Further, the mowers can not only move vertically in a lateral plane with respect to the direction of the unit, but they can move vertically with respect to the fore-and-aft plane. Thus the mower units may actually pivot about the axis of the pins or bolts 51, and such pivotal movement is restricted by an arm 59 affixed to the forks 49 and extending rearwardly to connect to the mower cross tube 61 through a bolt or pin 62. The arms 59 have uprightly disposed slots 63 which slidably receive the pin 62 so that the latter can be affixed to the cross tube 61, which in turn is connected to the mower side plates 44, and the rear end of the mowers can move up and down within the limits of the slots 63.

Other than having the mower frame 13 rest upon the tractor frame 12, the connection between the two frames is a hydraulic ram 64 consisting of a cylinder 66 and a rod 67. The cylinder 66 is disposed in a sleeve 68 affixed between the tractor cross frame pieces 33, as shown in FIG. 2. Also, a cylinder 69 receives the upper end of the piston rod 67, and the cylinder 69 is affixed to a cross frame piece 71 extending and connected to the sides 36 and 37 of the mower frame 13. Through this means, the mower frame retains its fore-and-aft position with respect to the tractor frame, and the mower frame 13 is raised and lowered between the FIG. 1 position and the FIG. 2 position. These are the mowing and transport positions respectively. FIGS. 1 and 2 also show a hood or cover 72 which includes the reservoir for the hydraulic system of which the ram 64 is a part. The hydraulic system also has three pumps 73 and one pump 74, all of which are powered by the prime mover 14 as indicated. Thus a drive pulley 76 is rotated by the engine 14, and a belt 77 extends to a pulley 78 which is connected to the three pumps 73 to drive the latter. Also, a belt 79 extends from the pulley 76 to the pulley 81 which is connected to the pump 74 to drive the latter. The three pumps 73 drive motors in the three mowers 41, 42, and 43, and the pump 74 drives the two motors in the traction wheels 16, and it also pressuries the ram cylinder 66. The ram cylinder 66 is secured in the mounting sleeve 68 by means of a pin 82 so that the cylinder can be slightly adjustable and pivotal therein to accommodate the mounting described for the connection between the two frames of the gang unit.

Figure 6:
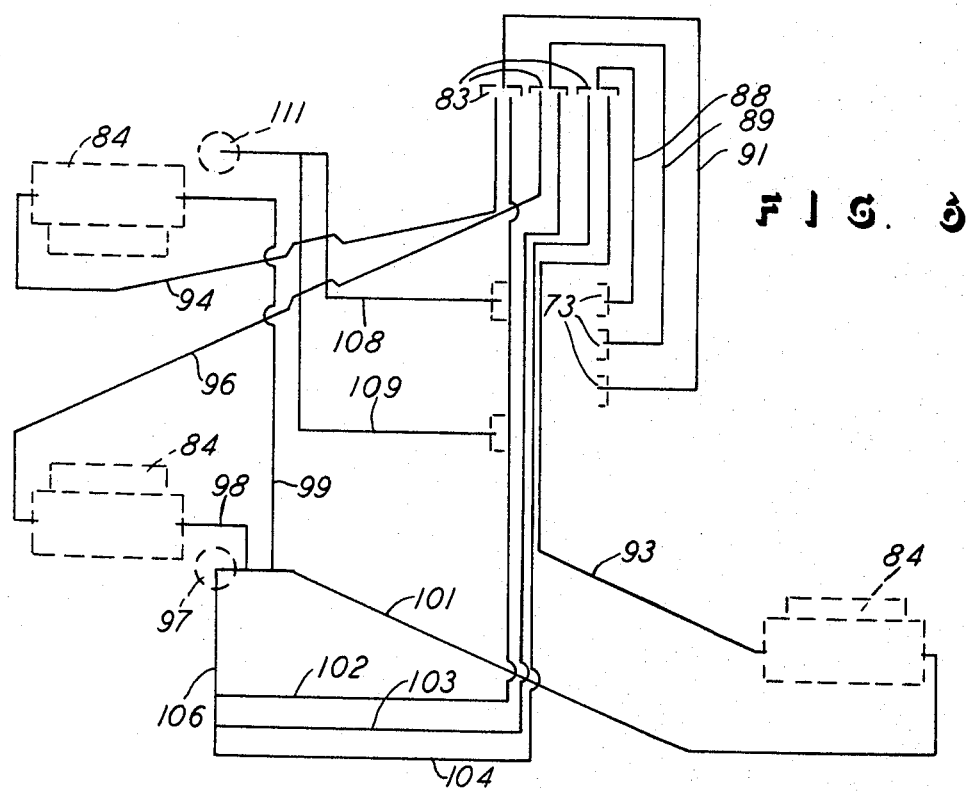
FIGS. 6 and 7 are schematic views of the hydraulic systems employed in the embodiment shown.

Of course suitable hydraulic lines or hoses extend between the pumps 73 and 74 and valves, such as three valves 83 for the pumps 73 and the reel motors 84, as indicated in FIGS. 1 and 6, in addition to FIG. 2.

FIG. 1 shows inlet and outlet hoses, 86 and 87, connected in pairs to the indicated reel motors 84 for the pressure and return lines with respect to the motors 84. Thus, all of the mower reels are driven in unison as desired so that the same cutting is effected by each of the reels.

FIG. 6 schematically indicates the three reel pumps 73 with hose pressure lines 88, 89, and 91, leading respectively into the three reel valves 83. Pressure lines 93, 94, and 96 are shown connected to the valves 83 with each leading into the dotted rectangles designating the respective reel motors 84. A reservoir tank return is designated at 97, and return lines 98, 99, and 101, are shown connected from the motors 84 to the return tank 97. Three return lines 102, 103, and 104, are shown connected to a header 106 and to the three valves 83. These are available for return of fluid when the reels are not operating. Also, pump suction lines 108 and 109 are connected between the pump 73 and the tank outlet header designated 111. Thus the hydraulic circuit for driving the three reel motors 84 is completed.

A common valve control arm 112 and rod 113 are shown in FIG. 2 to be connected through a control lever 114 and mounted on the handle 29. The operator therefore has control over the reel valves 83 to run them all in unison as desired.

Figure 7:
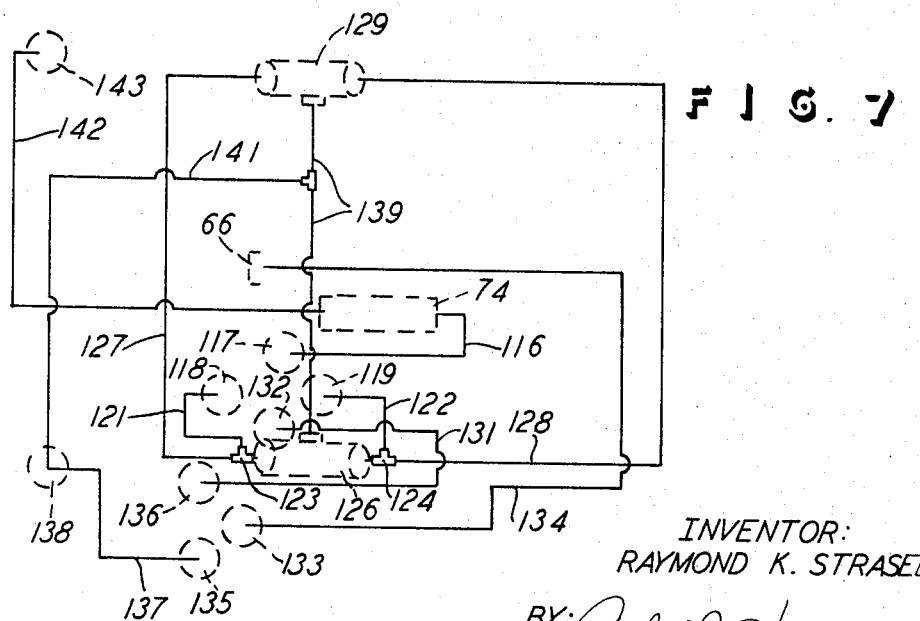

FIG. 7 shows the hydraulic system for the traction wheels 16 and the ram 64. Here it will be noted that the pump is shown at 74, and has a pressure line or hose 116 leading to one side of the four-way traction valve, and this side is designated 117. The traction valve has what may be designated two other sides 118 and 119, and they have hoses 121 and 122 respectively connected thereto and leading into a T 123 and a T 124. One side of each of the T's 123 and 124 leads into the traction motor 126, on one side of the gang unit, and the other side of each of the T's 123 and 124 has hoses 127 and 128 respectively connected thereto for leading into the traction motor designated 129, which is the motor on the other side of the unit. With the double leads into each of the motors 126 and 129, the motors may be run either forward or reverse for forward and reverse movement of the tractor. With the valve set to eject fluid at 118, the motors 126 and 129 are run forward. With fluid outlet at 119, the motors are in reverse.

A line or hose 131 extends from a fourth or neutral side designated 132 of the traction valve to the side designated 136 of the ram valve. This brings the hydraulic fluid to the ram valve. A pressure hose 134 extends from a side 133, of the ram valve, to the ram cylinder 66, as indicated. The ram valve also has a return line hose 137 extending from the valve side 135 to a tank return designated 138. The traction motors 126 and 129 also have a return bleed hose 139 connected thereto, and the hose 139 is connected to a hose 141 which extends to the tank return 138. Finally, a hose 142 connects to a tank outlet 143 and to the pump 74 for supplying the pump with hydraulic fluid. The pumps 73 and 74 are synchronized by the arrangement and drive described so that the forward speed of the gang unit through the traction wheels 16 is synchronized with the speed of rotation of the mower reels, for the desired mowing action.

Thus there is one pump supplying oil in an equal amount to each of the motors 126 and 129.

Sequence of traction flow in neutral is: 143, 142, 74, 116, 117, 132, 131, 136, 135, 137, 138.

Sequence of traction flow for motor 126 in forward is: 143, 142, 74, 116, 117, 118, 121, 123, 126, 124, 122, 119, 132, 131, 136, 135, 137, 138.

Sequence of traction flow for motor 126 in reverse is: 143, 142, 74, 116, 117, 119, 122, 124, 126, 123, 121, 118, 132, 131, 136, 135, 137, 138.

With respect to the ram and its valve, there is always a flow of oil under pressure entering ram valve port 136 when pump 74 is operating. Thus, the ram may be actuated with the traction in any one of forward, reverse, and neutral. The ram is a single acting type, and there is a relief valve by-pass from port 136 to port 135 for use when the ram is fully extended. Traction speed is not stopped when the relief valve is operating.

Ram flow sequence for raising is: 131, 136, 133, 134, 66; lowering is: 66, 134, 133, 135, 137, 138; neutral is: 131, 136, 135, 137, 138.

FIG. 2 shows that a control rod 144 connects to a control arm 146 for the traction valve described, and the rod 144 connects to a lever 147 pivotally mounted on the handle 29 for selective control by the operator. Also, a control rod 148 is connected to a control arm 149 for the ram valve described. The arm 148 also connects to a lever 151 mounted on the handle 29 for selective control by the operator for the raising and lowering of the mower frame 13 of the attached mower units.

FIGS. 1 and 4 show that there are grass catchers 152 for the two front mowers and the rear mower. These catchers are supported on front carriers 153 and a rear carrier 154. The carriers are pivotally supported on the mower frame so that they can pivot upwardly if they engage the ground and will therefore not be damaged or scuff the turf. The carriers have horizontal portions 156 which cradle the catchers 152 to carry the same, and they have angled portions 157 which are attached at their lower ends to the portion 156 and which are movably attached to the carrier frame.

FIGS. 3 and 4 show the catcher supporting portion 156 to be pivotally attached by means of pins or bolts 158 to the mower forks 49. The braces 157 are also supported on the mower forks by the pins 159 and through slots 161. Thus, the front catcher supports 156 can pivot upwardly from the positions shown, and within the limits of the slots 161, as the upper ends of the arms 157 slide over the supporting pins 159. It will therefore be understood that the catchers 152 are supported directly on the mower frame 13, and not on the mower 41 for instance, and thus no catcher weight or clipping contents is on the mower directly. Of course a deflector plate 162 is shown in FIG. 4 to extend around the reel 41 to deflect the clippings forwardly into the catcher 152.

The rear catcher 152 is supported on its frame support 154 through side arms, such as the shown arm 163, fixedly secured to the fork 49. A pivot pin 164 permits pivotal action between the members 154 and 163, and a supporting brace 166 connects between the two members. The brace 166 has a slot 167 restrained by and receiving a pin 168 so that the support piece 154 can pivot upwardly within the limits of the slot 167 which slides over the pin 168.

The tractor frame sections 34 carry forks 169 which extend above the mower forks 49 such that upon raising the mower frame 13, the tractor forks 169 engage the mower forks 49 to secure the latter in an oriented position for transport. This retains the mowers against swinging and getting out of alignment in transport so that a restricted width of passageway may be negotiated with the mower unit, and there will be no damage to the mowers since they will be held firmly by the forks 169.

FIG. 2 shows upright members 171, which are fixed to the tractor frame 18, extending above the frames to support the reservoir 72 and to serve as a guide for the up and down movement of the mower frame 13. Also, a piece 172 is attached to the tractor frame 18 at the rearward portion thereof and at each side thereof, and the piece 172 is angled as shown to guide the mower frame 13 when the latter is lowered onto the frame 18. It will also of course be understood that the hoses described, such as the hoses 86 and 87, have sufficient length or slack so that the turning or steering of the mowers may be accomplished, and also the raising and lowering of the mowers and the pivoting in all directions may be accomplished. Also, the two hoses 86 and the two hoses 87 are represented by the two lines 94 and 96 and 98 and 99 lines.

The connection between the mower frame and the three mowers themselves, that is, the pins 51 and slots 58 on the forks 49, is a lost motion connection.

Also, the ram 64 is located at the center of gravity of the carrier frame 13, all the mowers and catchers and other attachments to the frame 13, so the entire mass is raised evenly.

Wheels 16 are oversized or of a substantial width to give only a minimum of ground pressure and turf impression. Wheels 17 are only balancing and steering wheels, as the wheels 16 are centrally located on the tractor unit.

While a specific embodiment of this invention has been shown and described, it should be obvious that certain changes could be made in the embodiment and the invention should therefore be determined only by the scope of the appended claims.

What is claimed is:

1. A gang lawnmower comprising a tractor unit including a tractor frame and wheels for movably supporting said tractor frame in a horizontal plane, a carrier frame of the similar plan configuration as that of said tractor frame and resting on top of said tractor frame and being vertically movable thereabove, hydraulic lift means connected between said tractor frame and said carrier frame for raising and lowering the latter, a plurality of lawnmowers attached to said carrier frame and depending therefrom through a lost motion connection effective in the vertical direction and arranged to have said mowers vertically movable on said carrier frame between upper and lower limits of movement, the weight of said carrier frame being supported on said tractor frame when said mowers are on the ground.

2. A gang lawnmower comprising a tractor unit including a tractor frame and wheels for movably supporting said tractor frame in a horizontal plane, a carrier frame of the similar plan configuration as that of said tractor frame and resting on top of said tractor frame and being vertically movable thereabove, hydraulic lift means connected between said tractor frame and said carrier frame for raising and lowering the latter, a plurality of lawnmowers attached to said carrier frame and depending therefrom through a lost motion connection effective in the vertical direction and arranged to have said mowers vertically movable on said carrier frame between upper and lower limits of movement, the weight of said carrier frame being supported on said tractor frame when said mowers are on the ground, power means connected to said wheels and to said mowers for driving said wheels and said mowers in synchronization of forward movement and mowing action respectively.

3. A hydraulically powered gang lawnmower comprising a tractor unit including a prime mover and a support means and traction wheels for movably supporting said tractor unit, a hydraulic pump and hydraulic motors and a wheel-drive hydraulic valve all hydraulically connected together included in said tractor unit, said pump being connected to said prime mover to be driven thereby and said motors being connected to said wheels for driving the latter, a gang of lawnmowers vertically movably associated with said support means to be conveyed thereby and raised and lowered with respect thereto, a hydraulic ram operatively associated with said mowers for raising and lowering them, said wheel-drive hydraulic valve having a neutral side, and a ram hydraulic valve connected to both said neutral side of said wheel-drive hydraulic valve and to said ram for controlling hydraulic flow therebetween.

4. A hydraulically powered gang lawnmower comprising a tractor unit including a prime mover and a support means and traction wheels for movably supporting said tractor unit, a gang of lawnmowers operatively associated with said support means to be conveyed thereby, separate hydraulic motors connected to each of said traction wheels and each of said mowers for rotating said traction wheels and said mowers, a hydraulic pump connected to all said traction wheel motors for rotating the latter together, additional hydraulic pumps separately connected to each of said mower motors for rotating the latter together, all said pumps being connected to said prime mover and driven in unison off said prime mover to synchronize forward movement of said tractor and rotation of said mowers.

5. A gang lawnmower comprising a tractor unit including a support means and wheels for movably supporting said tractor unit, a frame vertically movably supported on said support means, lift means connected between said support means and said frame for raising and lowering the latter, a plurality of lawnmowers attached to said frame through a lost motion connection operative between said mowers and said frame and being effective in the vertical direction and arranged to have said mowers fully vertically movable with respect to said frame between upper and lower limits of movement, said lost motion connection being arranged to have the full weight of said frame on said support means when said mowers are on the ground and with none of the weight of said frame being on said mowers.

6. A gang lawnmower comprising a tractor unit including a support means and traction wheels for movably supporting said tractor unit, drive means connected to said wheels for driving the latter, a single frame vertically movably supported on said support means, hydraulic lift means connected between said support means and said single frame for raising and lowering the latter, and a plurality of reel-type lawnmowers attached to said single frame in a lost motion connection for raising and lowering all of said mowers in unison with said single frame, said lost motion connection including a lower limit restricting downward movement of said mowers with respect to said single frame and including means for disposing said mowers on the ground free of any weight of said single frame, and hydraulic motor means connected to the reels of said mowers for rotating the latter in unison.

7. A gang lawnmower comprising a steerable tractor unit including a support means and wheels for movably supporting said tractor unit, a frame vertically movably supported on said support means, lift means connected between said support means and said frame for raising and lowering the latter, a plurality of lawnmowers, and a plurality of vertically disposed pivot means connected between said frame and said lawnmowers for pivotal steering of said lawnmowers with said tractor when said mowers are lowered to the ground and for raising and lowering all of said mowers in unison with said frame, and guide means attached to said tractor unit and free of said mowers in the mowing position for pivotal action of said mowers when mowing and said guide means including a stationary portion disposed in the path of vertical movement of said mowers and engageable with said lawn mowers upon raising of the latter for holding said lawnmowers from swinging on said frame in the raised position.

8. A gang lawnmower comprising a tractor unit including a support means and wheels for movably supporting said tractor unit, a frame vertically movably supported on said support means and including a plurality of lawnmower attaching means having vertically disposed slots with upper and lower stop limits, lift means connected between said support means and said frame for raising and lowering the latter, a plurality of lawnmowers including pins slidably disposed in said vertically disposed slots for vertically self-adjustably connecting said mowers to said attaching means and intermediate said upper and lower stop limits of said slots when said mowers are on the ground and to thereby have said mowers free of the weight from said attaching means and for raising and lowering all of said mowers in unison with said frame.

9. A gang lawnmower comprising a tractor unit including a support means and wheels for movably supporting said tractor unit, a frame vertically movably supported on said support means, lift means connected between said support means and said frame for raising and lowering the latter, a plurality of lawnmowers, lost motion means for attaching said lawnmowers to said frame for raising and lowering all of said mowers in unison with said frame and for placing said mowers on the ground and free of any weight of said frame being on said mowers, and a plurality of grass catchers supported directly on said frame adjacent said lawnmowers and free of placing any weight of said catchers on said mowers.

10. A gang lawnmower for effecting a smooth cut and a minimum of impression in the turf, comprising a powered tractor unit including support means and wheels having a substantial width for movably supporting said support means with a minimum of ground pressure, steering wheels included in said tractor unit for steering and balancing said tractor unit, handles included in said tractor unit for steering control thereof, a mower carrier frame mounted on said tractor unit and supported thereby and being vertically movable thereon, a plurality of grass catchers and a like plurality of lawnmower attaching means both being connected to said carrier frame for full support of the weights thereof on said tractor unit, and a like plurality of lawnmowers vertically freely connected to said attaching means and with the latter including limit stops for limited vertical movement of said mowers on said carrier frame and to have said mowers propelled by said tractor unit and whereby said mowers are free of any weight of said tractor unit, said carrier frame, said catchers, and said attaching means.

11. A gang lawnmower comprising a tractor unit including a support means and wheels for movably supporting said tractor unit, a single frame vertically movably supported on said support means, lift means connected between said support means and said frame for raising and lowering the latter, a plurality of lawnmowers vertically movably mounted on said single frame and with the latter and said mowers including a lost motion connection therebetween for upper and lower limits of guided movement of said mowers on said single frame for freely riding on the ground free of the weight of said single frame on said mowers when said mowers are being guided in positions on said single frame between said limits, said limits being arranged so the weight of said single frame is fully supported on said support means when said mowers are on the ground.

References Cited
UNITED STATES PATENTS

| | | | |
|---|---|---|---|
| 1,330,293 | 2/1920 | Worthington | 56—7 |
| 1,437,874 | 12/1922 | Townsend | 56—7 |
| 2,015,740 | 10/1935 | Worthington | 56—7 |
| 2,071,118 | 2/1937 | Graham | 172—311 |
| 2,285,306 | 6/1942 | Roseman | 56—7 |
| 2,672,000 | 4/1954 | Speiser | 56—7 |
| 3,177,638 | 4/1965 | Johnson | 56—26 |

ABRAHAM G. STONE, *Primary Examiner.*

PASQUALE A. RAZZANO, *Assistant Examiner.*